(12) United States Patent
Liberg et al.

(10) Patent No.: US 8,671,321 B2
(45) Date of Patent: Mar. 11, 2014

(54) METHOD AND APPARATUS FOR RETRANSMISSION PROCESSING IN A COMMUNICATION RECEIVER

(75) Inventors: Olof Liberg, Stockholm (SE); Miguel Lopez, Solna (SE); Sajal Kumar Das, Kolkata (IN); Mårten Sundberg, Årsta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/536,146

(22) Filed: Jun. 28, 2012

(65) Prior Publication Data

US 2014/0006890 A1   Jan. 2, 2014

(51) Int. Cl.
*H04L 1/18* (2006.01)

(52) U.S. Cl.
USPC .......................................................... 714/748

(58) Field of Classification Search
USPC .......................................................... 714/748
See application file for complete search history.

(56) References Cited

U.S. PATENT DOCUMENTS

| | | | | |
|---|---|---|---|---|
| 5,677,918 A | * | 10/1997 | Tran et al. | 714/748 |
| 5,844,918 A | * | 12/1998 | Kato | 714/751 |
| 5,983,382 A | * | 11/1999 | Pauls | 714/744 |
| 6,353,907 B1 | * | 3/2002 | van Nobelen | 714/746 |
| 7,793,189 B2 | * | 9/2010 | Yano et al. | 714/748 |
| 8,433,968 B2 | * | 4/2013 | Gotman et al. | 714/751 |
| 2002/0107987 A1 | | 8/2002 | Malm | |

FOREIGN PATENT DOCUMENTS

WO   2005020502 A1   3/2005

OTHER PUBLICATIONS

Wu, Jun etal, "The Incremental Redundancy H-ARQ for Convolutional Coding", IEEE 802.16 Broadband Wireless Access Working Group, Sep. 2, 2004, San Diego, CA 92121.
Bauch,G. and Franz, V. "Iterative Equalization and Decoding for the GSM—System", Vehicular Technology Conference VTC 98. vol. 3, 1998, pp. 2262-2266, Ottawa, Canada.
3rd Generation Partnership Project. 3GPP TS TS 45.003 V10.0.0 (Mar. 2011) Technical Specification Group GSM/EDGE Radio Access Network;Channel coding (Release 10). Mar. 2011.
3rd Generation Partnership Project. 3GPP TS 43.064 V10.0.0 (Sep. 2010) Technical Specification Group GSM/EDGE Radio Access Network;General Packet Radio Service (GPRS);Overall description of the GPRS radio interface; Stage 2 (Release 10). Sep. 2010.
Global System for Mobile Communications.GSM 05.02 version 8.5.0 Release 1999 Digital cellular telecommunications system (Phase 2+); Multiplexing and multiple access on the radio path (Release 1999) 1999.

* cited by examiner

*Primary Examiner* — James C Kerveros
(74) *Attorney, Agent, or Firm* — Murphy, Bilak & Homiller, PLLC (57) ABSTRACT

A method and apparatus for retransmission processing in a communication receiver includes improving the performance of Incremental Redundancy (IR) combining and retransmission processing at minimal increased complexity. One aspect of these improvements involves the use of prior decoding results, if the decoding block quality is above a threshold value, rather than or in addition to prior demodulation results, in retransmission processing. That is, the teachings herein propose selectively using the hard bit decisions obtained from decoding previously transmitted data blocks, to improve the decoding of retransmitted data blocks.

24 Claims, 4 Drawing Sheets

METHOD AND APPARATUS FOR RETRANSMISSION PROCESSING IN A COMMUNICATION RECEIVER

TECHNICAL FIELD

The present invention generally relates to communication systems, and particularly relates to retransmission processing in a communication receiver.

BACKGROUND

Techniques for lowering and correcting transmission errors enable higher data rates and greater reliability in wireless communication systems. Various known methods are employed to reduce bit error rates. Physical layer (L1) techniques include transmit diversity, equalization, and channel coding (Forward Error Correction or FEC). These approaches improve received signal quality and/or reduce the bit error rate through correction.

Automatic Repeat Request (ARQ) is another error detection mechanism, which is used in the Link layer (L2). With ARQ, the receiver signals the transmitter whenever it incorrectly receives a data block. The transmitter resends the data block in response to a negative acknowledgment (NACK) returned from the receiver.

Hybrid-ARQ (HARQ) is a combination of L2 ARQ and L1 FEC. With HARQ, when a receiver erroneously receives a data block—i.e., where decoding of the data block fails—it saves the demodulation results obtained for the failed data block and requests a retransmission. When the receiver receives a retransmitted version of the failed data block, it improves its prospects for successful decoding by combining the saved demodulation results with the demodulation results obtained for the retransmitted data block.

In this context, the receiver knows that a data block has failed based on demodulating the data block to obtain demodulation results, which here comprise soft bit values corresponding to detected symbols in the received signal, and decoding the demodulation results to obtain hard bit values corresponding to the information bits conveyed in the data block. Decoding "fails" if the Cyclic Redundancy Check (CRC) or other verification value of the received data block does not match the expected decoding results. HARQ therefore can be understood as a "soft combining" process that combines the soft bit values demodulated from a data block that failed decoding with the soft bit values demodulated from a retransmitted version of that data block.

Receivers operating according to the Global System for Mobile Communications (GSM) standard are known to use two types of soft combing techniques. One approach is referred to as "Chase combining," where the receiver uses maximum-ratio combining to combine the soft bit values demodulated from retransmissions of the same data block. As all transmissions are identical, Chase combining can be seen as a repetition coding technique. In contrast, the identical data block is not retransmitted according to a second approach that is referred to as "Incremental Redundancy" or IR combining.

When decoding fails for an "original" data block in the IR combining context, the transmitter does not retransmit an identical copy of the failed data block and instead retransmits a different redundancy version or versions of the failed data block. Each such redundancy version has an incrementally different encoding. The re-transmitted bits are determined by the "puncturing" scheme used by the transmitter and may be completely different from the bits in the original transmission and/or any previous retransmission. At every retransmission the receiver gains extra information, and the IR approach can be understood as gradually increasing the redundancy over the repeated transmissions, while correspondingly decreasing the effective coding rate at the receiver.

HARQ algorithms have become an integral part of packet communication systems. The Enhanced Data rates for GSM Evolution (EDGE) cellular radio standard, for instance, defines error correction code, puncturing patterns and retransmission policies that allow the combining of received information from multiple transmissions to improve the likelihood of successful decoding. Additionally, Third generation cellular systems, such as High Speed Downlink Packet Access (HSDPA), now permit variable length retransmissions of corrupted packets. The HSDPA standard supports both chase combining and incremental redundancy.

SUMMARY

While Incremental Redundancy (IR) combining offers performance improvements as compared to Chase combining, those improvements come at the expense of increased complexity. Among the several advantages of the teachings disclosed herein are techniques for further improving the performance of IR combining and retransmission processing in general, at minimal increased complexity. One aspect of these improvements involves the use of prior decoding results, rather than or in addition to prior demodulation results, in the soft combining processing. That is, the teachings herein propose using the hard bit decisions obtained from decoding previously transmitted data blocks to improve the decoding of retransmitted data blocks.

Accordingly, the teachings herein disclose a method of retransmission processing in a communication receiver. In an example implementation, the method includes obtaining second soft bits by demodulating a second data block received as a retransmission of an earlier received first data block that was unsuccessfully decoded by the receiver. At least for the case where the first data block satisfies a block quality target, the method further includes forming combined demodulation results for decoding by combining the second soft bits with regenerated soft bits obtained by transforming first hard bits into the regenerated soft bits.

The "transformation" may comprise transforming the first hard bits—after re-encoding them—into soft bits and using them as the regenerated soft bits, or, in another example, transforming the first hard bits into soft bits and combining those soft values with respective ones of the first soft bits, to obtain the regenerated soft bits. In either case, the first hard bits comprise decoding results obtained by decoding first soft bits obtained by demodulating the first data block, and the method further includes decoding the combined demodulation results in an attempt to correctly recover information bits encoded in the first and second data blocks.

In the case that the first data block does not satisfy the block quality target, the method may "fall back" to soft combining processing that does not use the regenerated soft bits, and instead uses only the first and second soft bits. Such operation can be understood as being "modal" in dependence on the block quality. When the block quality is sufficient, the receiver performs soft combining using the regenerated soft bits and the second soft bits. Conversely, when the block quality is deficient, the receiver does not use the regenerated soft bits, and may simply make a soft combination of the first and second soft bits.

Of course, the method may be repeated for multiple retransmissions, and soft combining, with or without the use of regenerated soft bits from prior failed transmissions, may be applied across multiple retransmissions. Regardless of whether applied to a single retransmission or performed across multiple transmissions, the method improves soft combining by using the decoding results obtained for one or more prior failed transmissions, at least in cases where the block quality pertaining to such transmissions is sufficient.

A communication receiver is also disclosed, where the receiver is configured to perform retransmission processing according to the teachings herein. In an example embodiment, the receiver includes one or more processing circuits that are configured to carry out the improved retransmission processing disclosed herein, including the use of regenerated soft bits in soft combining operations.

In an example configuration, the one or more processing circuits are programmed or otherwise arranged or adapted to obtain second soft bits by demodulating a second data block received as a retransmission of an earlier received first data block that was unsuccessfully decoded by the receiver, and, at least where the first data block meets a block quality target, form combined demodulation results for decoding by combining the second soft bits with regenerated soft bits obtained by transforming first hard bits into the regenerated soft bits. The one or more processing circuits of the receiver are further configured to decode the combined demodulation results in an attempt to correctly recover information bits encoded in the first and second data blocks. As non-limiting examples, the one or more processing circuits may be fixed or programmable circuits, e.g., one or more microprocessors, DSPs, or other digital processing circuitry.

As detailed for the example retransmission processing method, the example receiver may dynamically toggle between using and not using regenerated soft bits in its soft combining operations, in dependence on changing signal quality. The decision to use or not use regenerated soft bits in soft-combining processing for retransmissions may be made on a per data block basis, or may be made over a longer duration.

Regardless, it is contemplated herein to implement a wireless communication apparatus to include such a receiver, so that the apparatus benefits from the improved retransmission processing provided by the receiver. As a non-limiting example, the wireless communication apparatus comprises a mobile device, such as a handset, modem, or other network access device. In at least one instance, the wireless communication device comprises a GSM/EDGE compatible communication device designed to operate in a GSM/EDGE wireless communication network. However, the teachings herein have applicability beyond GSM/EDGE, such as to networks based on the Long Term Evolution (LTE) standard.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
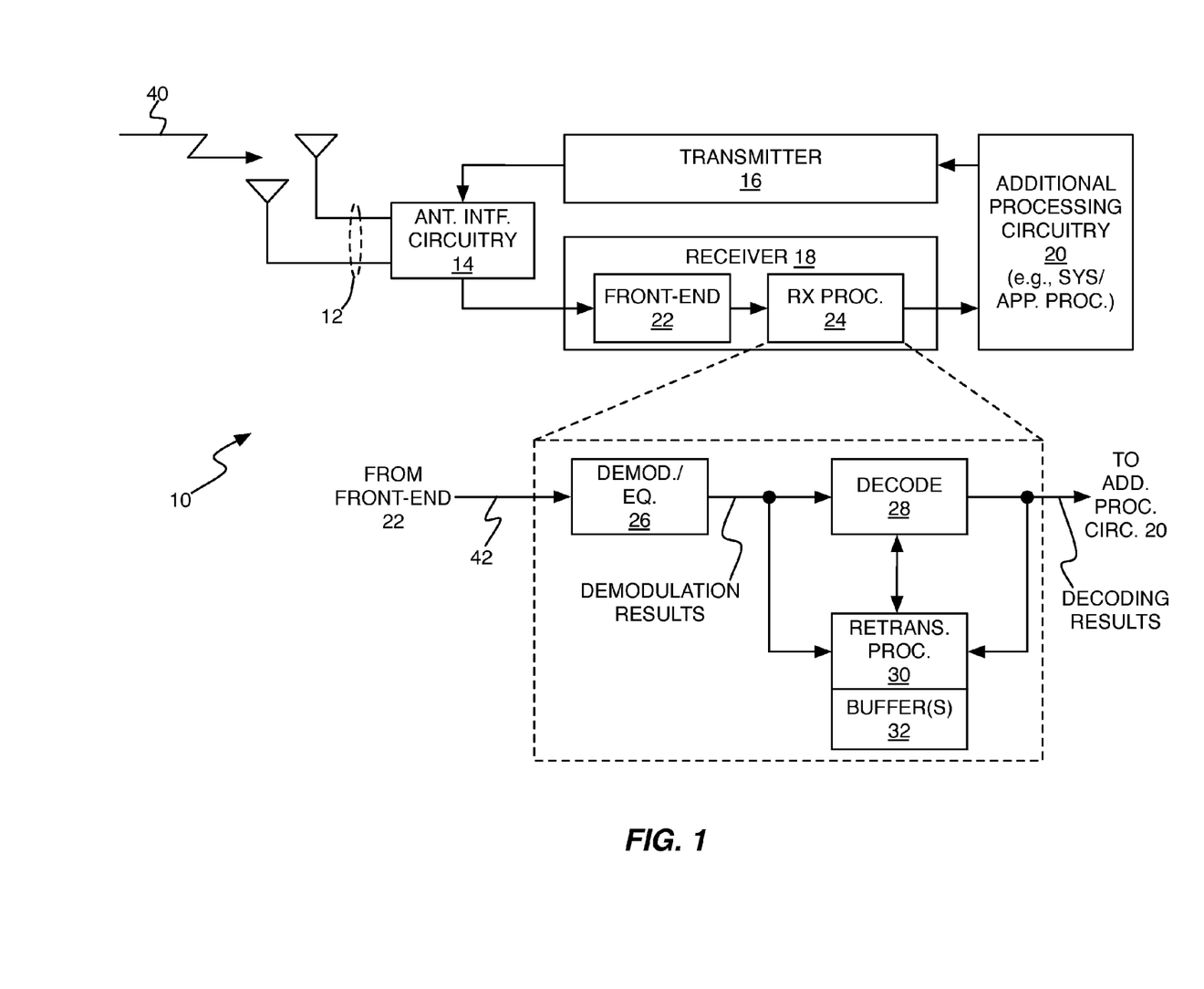
FIG. 1 is a block diagram of one embodiment of a wireless communication apparatus that includes an example communication receiver configured to perform retransmission processing according to the teachings herein.

FIG. 1 is a block diagram of one embodiment of a wireless communication apparatus 10 (hereafter, "apparatus 10"). Advantageously, the apparatus 10 is configured to improve retransmission processing through the use of "regenerated soft bits," which are obtained by transforming decoded hard bit decisions from a failed decoding attempt into corresponding soft bit values. The regenerated soft bits, which in some embodiments are further based on the soft bits used as inputs for the failed decoding attempt, are then used in a soft combining process with the soft bit values obtained from a subsequent retransmission.

In more detail, the apparatus 10 in the disclosed example includes one or more transmit/receive antennas 12 and associated interface circuitry 14 coupling the antenna(s) 12 to a transmitter 16 and a receiver 18. The apparatus 10 further includes additional processing circuitry 20, such as a system processor and/or interface circuitry, all in dependence on the intended use and feature set of the apparatus 10. The details of such additional circuitry and the features attendant therewith are not germane to the teachings herein.

Of more particular interest is the configuration of the receiver 18, which provides the apparatus 10 with its improved retransmission processing. In the example architecture, the receiver 18 includes a front-end circuit 22 and associated receiver processing circuits 24.

The front-end circuit 22 operates on an antenna-received signal 40 and provides a corresponding received signal 42 that serves as the input received signal 42 for the receiver processing circuits 24. Example front-end processing includes filtering, amplification, gain control, and digitization, such that the received signal 42 comprises a stream of digitized sample values corresponding to the antenna-received signal 40.

In turn, the receiver processing circuits 24 operate on the received signal 42 and include a demodulation/equalization circuit 26 that demodulates/equalizes the received signal 42 and thereby output soft bit values corresponding to received symbols as detected in the received signal 42 by the demodulation/equalization circuit 26. For convenience, the demodulation/equalization circuit 26 is more concisely referred to as the "demodulation circuit 26."

The demodulation results, i.e., the soft bit values, output by the demodulation circuit 26 flow into a decoding circuit 28 and a retransmission processing circuit 30, which includes or is associated with one or more buffers 32 or other storage that may be used to at least temporarily "save" demodulation and decoding results in support of the improved retransmission processing taught herein. The decoding circuit 28 outputs demodulation results.

Figure 2:
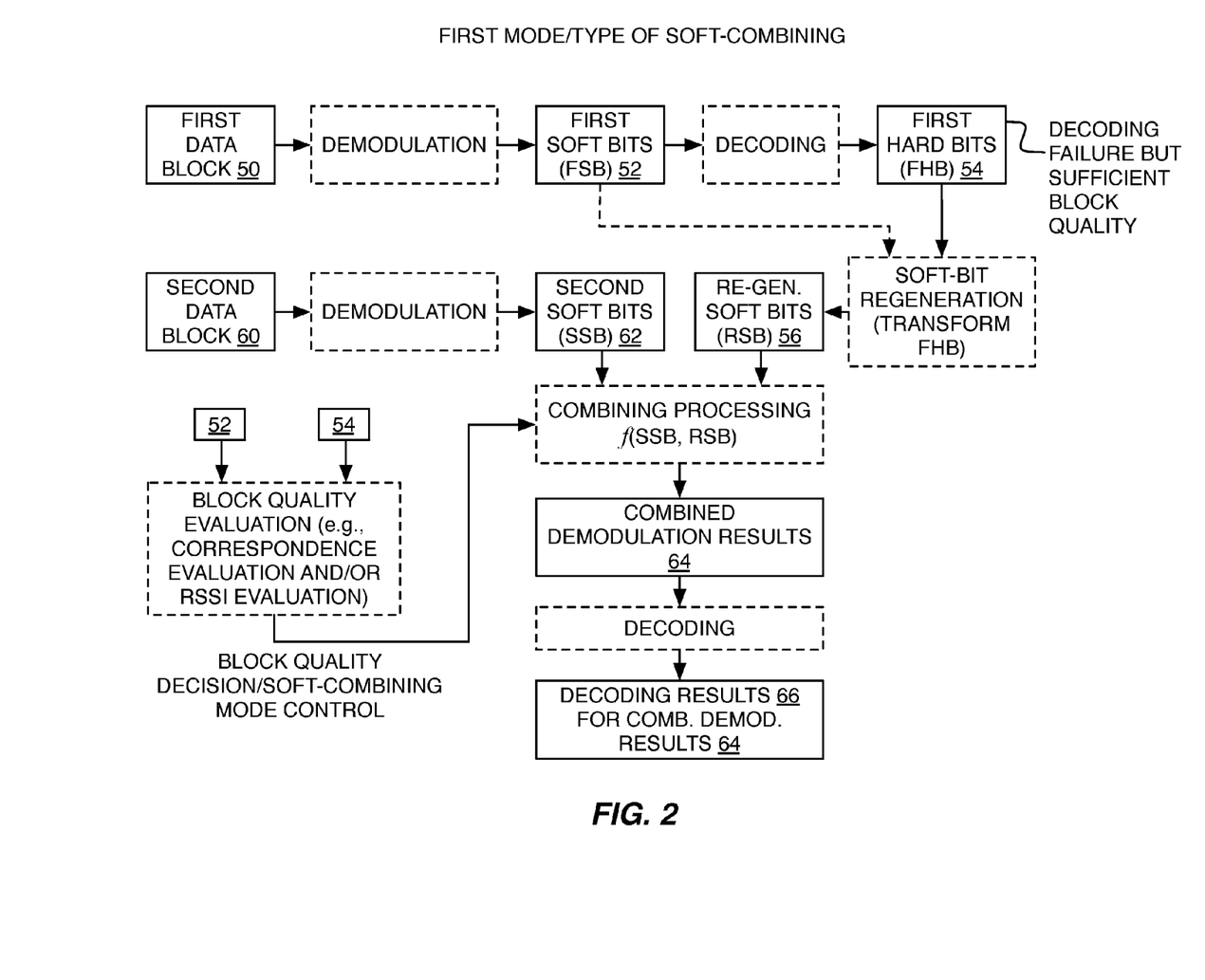
FIGS. 2 and 3 are processing flow diagrams illustrating an example of selective use of two types of retransmission combining, in dependence on evaluation of data block quality.

With reference to FIGS. 1 and 2, the receiver 18 receives a first data block 50 and demodulates that first data block 50 to produce corresponding demodulation results comprising first soft bits 52. These first soft bits 52 are decoded, to obtain decoding results comprising first hard bits 54. Assuming that such decoding fails, e.g., the first hard bits 54 do not pass CRC or other validation checking, the apparatus 10 sends a NACK or other indication of the decoding failure, and the remote transmitter (not shown in FIGS. 1 and 2) transmits a second data block 60 to the apparatus 10 as a retransmission, e.g., the second data block 60 is a copy of the first data block 50 or is an IR version of the first data block 50.

The second data block 60 is demodulated to obtain demodulation results comprising second soft bits 62. Now, in conventional soft combining processing, these second soft bits 62 would be combined with the first soft bits 52, in an attempt to produce combined demodulation results that will generally have "improved" confidence or reliability as compared to either the first or second soft bits 52 or 62 taken alone. However, according to the teachings herein, retransmission processing is improved by forming the combined demodulation results 64 as a function of the second soft bits 62 associated with the retransmission and as a function of regenerated soft bits 56 that are obtained by transforming the first hard bits 54 into soft bit values and, in one or more embodiments, combining them with the first soft bits 52. Notably, this processing exploits the bit improvements gained via error correction in the decoding process applied to the first soft bits 52, even though that decoding process failed.

Thus, the regenerated soft bits 56 may be the soft values obtained by transforming the first hard bits 54 into corresponding soft values, which includes re-encoding the first hard bits 54 and converting the re-encoded bits into soft values. Alternatively, the regenerated soft bits 56 may be formed as a combination of the first soft bits 52 with the transformed soft values obtained from the re-encoded first hard bits 54. This latter approach makes the combined demodulation results 64 functionally depend on the first soft bits 52 because they are used in combination with the transformed soft values obtained from the first hard bits 54, to obtain the regenerated soft bits 56, which are then combined with the second soft bits 62 to obtain the combined demodulation results 64. As a further alternative, the regenerated soft bits 56 may be formed without use of the first soft bits 52, but the first soft bits 52 may still be used in the formation of the combined demodulation results 64 by including them as a third element in the functional combination used to form the combined demodulation results 64, along with the regenerated soft bits 56 and the second soft bits 62.

Of course, the soft-combining processing taught herein may dynamically decide not to use regenerated soft bits 56 when forming the combined demodulation results 64. This option touches on a decision-making aspect of the present teachings. Namely, a block quality evaluation function implemented in the receiver 18 may be used to decide whether or not to use the regenerated soft bits 56 when forming the combined demodulation results 64, but at least where signal quality is sufficient, the decoding results 66 obtained from the combined demodulation results 64 are improved as compared to conventional soft combining known for retransmission processing, by using the regenerated soft bits 56 in forming the combined demodulation results 64.

Figure 3:
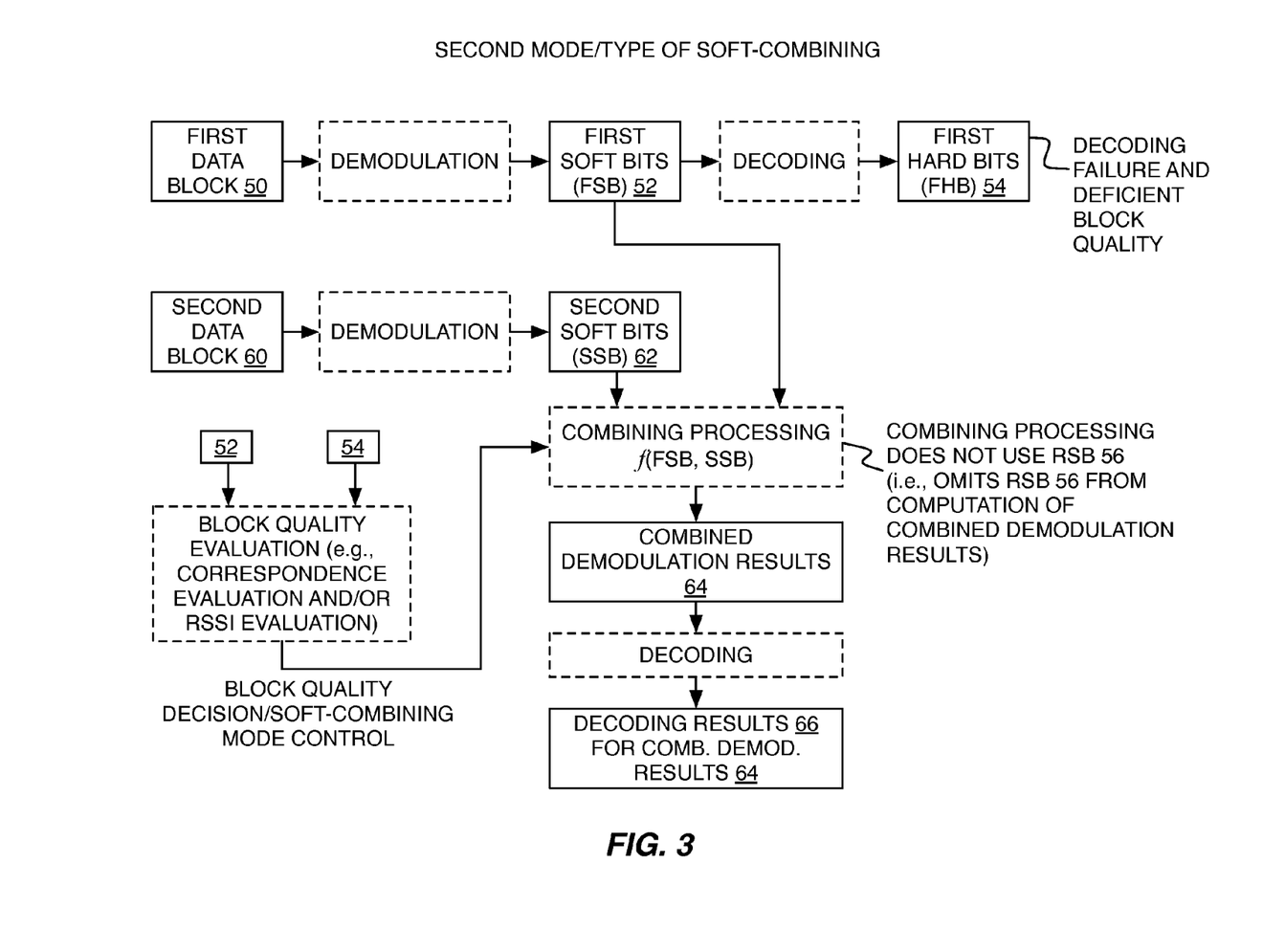

In a simple example, the block quality of the first data block 50 is evaluated in relation to a statically or dynamically defined block quality target. If the block quality target is satisfied, then the regenerated soft bits 56 are used in forming the combined demodulation results 64; otherwise they are not used. This decision-making allows the receiver 18 to dynamically change from a first mode of retransmission processing to a second mode of retransmission processing, in dependence on block quality. See the retransmission processing outlined in FIG. 2, where decoding fails for a first data block 50 but where a block quality satisfies the block quality target, as contrasted with the retransmission processing outlined in FIG. 3, where decoding fails for a first data block 50, and where the block quality does not satisfy the block quality target.

In the first mode or type, the receiver 18 forms the combined demodulation results 64 using the regenerated soft bits 56 and the second soft bits 62. In at least some embodiments, in the first mode, the receiver 18 also uses the first soft bits 52, so that the combined demodulation results 64 are formed as a function of the regenerated soft bits 56, the first soft bits 52, and the second soft bits 62. If such processing is carried across multiple retransmissions, additional sets of soft bits and/or regenerated soft bits may also be used.

In an example of extending the above processing over multiple retransmissions, assume that after a first (failed) transmission, the receiver 18 has saved first soft bits 52, first hard bits 54, and has formed corresponding first regenerated soft bits 56. After receiving the second transmission, the receiver 18 combines the first regenerated soft bits 56 with the second soft bits 62 obtained from the second transmission, and decodes the resulting combined demodulation results 64 to get second hard bits. If the CRC fails for these second hard bits, a third transmission is needed. The receiver 18 creates second regenerated soft bits from the first regenerated soft bits 56, the second soft bits 62, and the second hard bits (which are transformed into soft values). When the third transmission is received, the receiver 18 combines the third soft bits obtained from demodulation of the third transmission with the second regenerated soft bits, to obtain combined demodulation results for decoding. If that third decoding fails, the process carries forward in the same pattern, i.e., the receiver creates third regenerated soft bits from the second regenerated soft bits, the third soft bits, and the third hard bits (which are transformed into soft values). The processing for further retransmissions, if needed, progresses in like manner and the block quality evaluation may be performed in each such iteration as the basis for deciding whether or not to use regenerated soft bits in the soft-combining process of each iteration.

In an alternative implementation of extending the use of regenerated soft bits across multiple transmissions, let "SBX" denote the soft bits demodulated from transmission "X," "RSBX" denote the regenerated soft bits obtained by decoding transmission λ using only the regularly demodulated soft bits SBX, and not regenerated soft bits. So, after a failed first transmission, the receiver 18 has SB1 and RSB1. After the second transmission, the receiver 18 has SB1, SB2, and RSB1 and can form the combined demodulation results for decoding as $$f(SB1+SB2,RSB1).$$

If the second decoding fails, after the third transmission, the receiver 18 will have $$f(SB1+SB2+SB3,RSB2),$$

where RSB2 represents the re-generated soft bits based on decoding of SB1+SB2 (and not SB1+SB2+RSB1). This pattern may be carried forward over additional retransmissions, as needed.

The above examples represent variations of the first mode or type of soft-combining processing, where regenerated soft bits are used. The second mode or type distinguishes from the first mode or type in that regenerated soft bits are not used in forming the combined demodulation results for decoding. It will be understood that in one or more embodiments, dynamically selecting which mode to operate in represents one aspect of the improved retransmission processing taught herein, and advantageously limits the use of retransmission processing in dependence on the regenerated soft bits to times of sufficient signal quality. In other words, in at least one embodiment, the receiver 18 is imbued with the intelligence to use the regenerated soft bits when the signal quality was sufficient for decoding to yield improvements in bit reliability as compared to the corresponding soft bits, and otherwise to skip the use of the regenerated soft bits.

Broadly, returning to the first-and-second transmission example, the one or more processing circuits 24 are configured to obtain second soft bits 62 by demodulating a second data block 60 received as a retransmission of an earlier received first data block 50 that was unsuccessfully decoded by the receiver 18. At least where the first data block 50 meets a block quality target, the one or more processing circuits 24 are further configured to form combined demodulation results 64 for decoding, by combining the second soft bits 62 with regenerated soft bits 56 obtained by transforming the re-encoded first hard bits 54 into soft values. As noted, the first hard bits 54 comprise decoding results obtained by decoding first soft bits 52 obtained by demodulating the first data block 50, and the one or more processing circuits 24 are configured to decode the combined demodulation results 64 in an attempt to correctly recover information bits encoded in the first and second data blocks 50, 60.

Referring back to FIG. 1 momentarily, the one or more processing circuits 24 in an example implementation include: a demodulation circuit 26 that is configured to demodulate the first and second data blocks 50, 60, to obtain the first and second soft bits 52, 62, respectively; a decoding circuit 28 that is configured to decode the first soft bits 52 to obtain the first hard bits 54, and to decode the combined demodulation results 64; and a retransmission processing circuit 30 that is configured to evaluate whether the first data block 50 meets the block quality target and to correspondingly control whether the regenerated soft bits 56 are used in forming the combined demodulation results 64.

In the case that the first data block 50 does not meet the block quality target, the one or more processing circuits 24 are configured to omit the regenerated soft bits 56 from the combined demodulation results 64, e.g., to form the combined demodulation results 64 by combining the second soft bits 62 with the first soft bits 52.

In an example configuration, the one or more processing circuits 24 are configured to determine whether the first data block 50 meets the block quality target by evaluating a correspondence between the first soft bits 52 and the first hard bits 54. The correspondence may be evaluated by comparing sign values of the first soft bits 52 with corresponding sign values of the regenerated soft bits 56. In that case, a greater number of matching sign values indicates a higher block quality for the first data block 50. Alternatively, the correspondence may be evaluated by comparing bit values of the first hard bits 54 to bit values of converted hard bits obtained by making hard decisions on the first soft bits 52. A greater number of matching bit values indicates a higher block quality for the first data block 50.

It should be understood that the first soft bits 52 are de-punctured and de-interleaved before decoding to obtain the first hard bits 54. Thus, when evaluating the correspondence between the first soft bits 52 and the first hard bits 54, whether by converting the first hard bits 54 to soft values or by making hard decisions on the first soft bits 52, the processing circuits 24 are configured to account for the applicable interleaving and puncturing scheme—e.g., the first hard bits 54 are interleaved and punctured according to the applicable scheme, so that they may be properly compared with respective ones of the first soft bits 52. The same such re-encoding of the first hard bits 54 is observed when forming the regenerated soft bits 56.

Thus, the block quality of the first data block 50 can be assessed by comparing how well the first soft bit values 52 "match" corresponding ones of the first hard bit values 54. That assessment can be performed by converting the re-encoded first hard bits 54 into soft bits, for comparison of sign values in the "soft domain" or by converting the first soft bits 52 into hard bits—i.e., by making hard bit decisions on the soft values directly and not through decoding and comparing the resultant binary values to corresponding ones of the first hard bits 54.

As has been mentioned, various alternatives for computing the regenerated soft bits 56 are also contemplated herein. For example, one advantageous approach forms regenerated soft bits (RSB) as a combination of the soft bits (SB) obtained by demodulating a given received transmission, and the corresponding hard bits (HB) obtained by decoding the SB. This approach can be understood as $$RSB=SB+wHB,$$

where "w" is a function of the soft bit range, such as a maximum value, an average value, and a very small value, e.g., <<maximum value.

In at least one embodiment, the value of w is further adapted to reflect whether the decoded hard bit had been transmitted or punctured. For example, for a transmitted bit position, the value of w will be greater than the value of w used for a punctured bit position, as the punctured bit positions represent bits that were not transmitted and which therefore may be been decoded with lower confidence. In any case, the regenerated soft bits 56 in some embodiments are formed by weighting each first hard bit 54 with a confidence weighting value that sets confidence level of the resulting transformed soft bit, and combining the transformed soft bits with respective ones of the first hard bits 52 to obtain the regenerated soft bits (56). In a further example embodiment, the processing circuits 24 apply an equal weighting, e.g., 0.5, to both the SB and HB terms. Still further, w may be used as an implementation-dependent tuning factor, where the proportion of HB contribution is computed or adapted through tuning in the actual hardware platform or through system simulation.

The one or more processing circuits 24 also may be configured to form the combined demodulation results 64 according to a function that weights the regenerated soft bits 56 according to signal quality. In such embodiments, a lower signal quality results in less weighting of the regenerated soft bits 56 in forming the combined demodulation results 64 and a higher signal quality results in more weighting of the regenerated soft bits (56) in forming the combined demodulation results 64. Thus, in addition to using signal quality in a threshold sense as a decision variable on whether to use the regenerated soft bits 56 in forming the combine demodulation results 64, signal quality additionally may be used to scale or otherwise control the emphasis given to the regenerated soft bits 56.

Even though the regenerated soft bits 56 are associated with a failed decoding, weighting them as a function of data block quality reflects the advantageous recognition herein that higher signal quality generally corresponds to higher-quality decoding results. In an example case, a minimum weighting is applied when the block quality meets the quality target, and increased weighting is applied in correspondence with block quality exceeding the quality target. The weighting may increase in direct linear proportion, or the weighting changes may be quantized, so that two or more discrete weighting values are mapped to ranges of signal quality.

Various options also exist for forming the regenerated soft bits 56. In an example configuration, the one or more processing circuits 24 are configured to form each regenerated soft bit 56 as a sign determined by the binary value of the corresponding first hard bit 54 and a magnitude that is set to a low-confidence value in relation to the applicable range of soft bit magnitudes, if the corresponding first hard bit 54 corresponds to a punctured bit position in the first data block 50, or to a high-confidence value, if the corresponding first hard bit 54 corresponds to a non-punctured bit position in the first data block 50.

As is known, information bit encoding at the transmitter introduces redundancy, and puncturing removes some of that redundancy, effectively increasing the transmit bit rate. That is, punctured bits are omitted from the transmission. Accordingly, the one or more processing circuits 24 use a low confidence weighting for regenerated soft bits 56 that correspond to punctured bit positions. That is, the disclosed retransmission processing assigns low-confidence values to regenerated soft bits 56 that correspond to punctured bit positions in the first data block 50 and assigns high-confidence values to regenerated soft bits 56 that correspond to non-punctured bit positions in the first data block 50.

Another contemplated approach uses only the hard bit information corresponding to the punctured bits, because the equalizer has not given any information with regard to them. For the non-punctured bits, it deemed sufficient to use the equalizer soft bits—i.e., the soft bits as obtained from demodulation/equalization. Thus, in some embodiments, the regenerated soft bits 56 are formed as a set of soft bits comprising, for each non-punctured bit position, the corresponding first soft bit 52, and, for each punctured bit position, the corresponding one of the soft values obtained by converting the first hard bits 54, after re-encoding, into soft values.

Regardless, as those of ordinary skill in the art will understand immediately, a "conventional" soft bit value generally comprises a sign value that indicates whether the corresponding received bit is a 1 or a 0, and magnitude value reflecting the "confidence" level that the bit has been correctly detected as a 1 or a 0. Because different numeric scales are used, as is well known, to reflect the range of confidence values, the particular numeric value used to indicate a low-confidence value depends on implementation details, as does the particular numeric value used to indicate a high-confidence value. Regardless, it will be appreciated that the regenerated soft bits 56 can in some sense be considered as "artificial" in such embodiments, because they have a high or low magnitude in dependence on whether their corresponding first hard bits 54 did or did not occupy a punctured bit position in the first data block 50.

As for using the regenerated demodulation results 64 in forming the combined demodulation results 64, various approaches may be used—i.e., various functional dependencies are contemplated herein. In an example case, the one or more processing circuits 24 are configured to form the combined demodulation results 64 by adding each second soft bit 62 to the corresponding regenerated soft bit 56. The addition may be weighted to control how much each regenerated soft bit 56 contributes to the combination in relation to the respective second soft bit 62. If the first soft bits 52 are also used in forming the combined demodulation results 64, a separate weighting may be applied to them.

Figure 4:
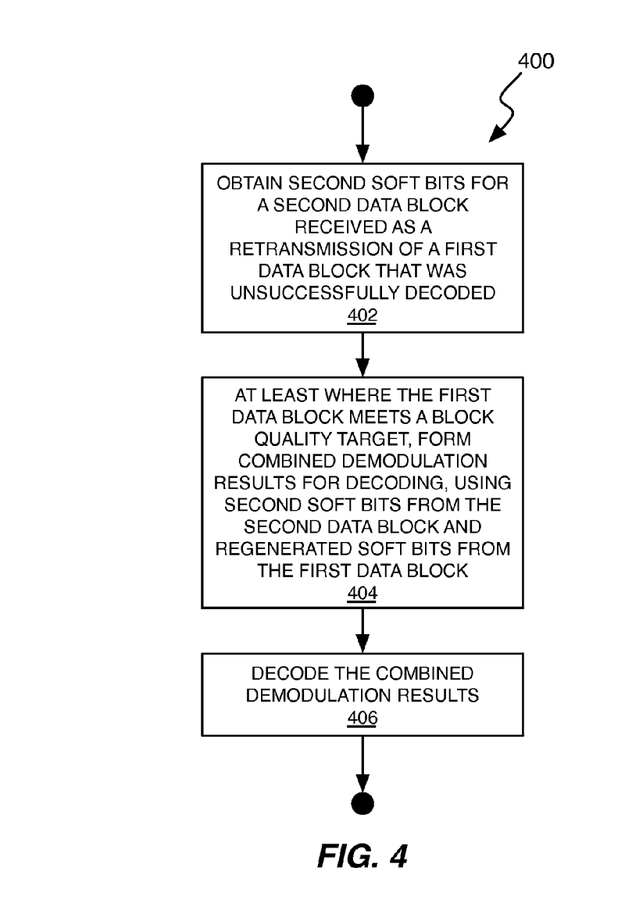
FIG. 4 is a logic flow diagram of one embodiment of a method of retransmission processing as contemplated herein, such as may be performed by the communication receiver of FIG. 1.

Regardless of the functional dependency, it will be understood that use of the regenerated soft bits 56 generally improves retransmission processing by exploiting the results of decoding the first data block 50, even though that decoding failed. FIG. 4 illustrates a method 400 of such processing, as may be implemented in the apparatus 10, including the receiver 18. One or more steps of the method 400 may be implemented in an order different from that illustrated. Additionally, or alternatively, certain steps of the method 400 may be performed in parallel, and the method 400 may, in whole or in part, be performed on a repeating or as-needed basis, and may be extended over multiple retransmissions.

Additionally, it will be understood that the one or more processing circuits 24 may be configured via fixed hardware to perform the method 400, or at least in part may be configured to perform the method 400 based on executing computer program instructions stored in a memory or other computer-readable medium that is accessible to one or more microprocessors, DSPs, or other digital processors included within the one or more processing circuits 24.

With this flexibility in mind, the method 400 defines an example of retransmission processing that includes obtaining second soft bits 62 by demodulating a second data block 60 received as a retransmission of an earlier received first data block 50 that was unsuccessfully decoded by the receiver 18 (Block 402). At least where the first data block 50 satisfies a block quality target, the method 400 further includes forming combined demodulation results 64 for decoding by combining the second soft bits 62 with regenerated soft bits 56 obtained by transforming first hard bits 54 into the regenerated soft bits 56 (Block 404), and decoding the combined demodulation results 64 in an attempt to correctly recover information bits encoded in the first and second data blocks 50, 60 (Block 406). As explained before, the first hard bits 54 represent decoding results obtained by decoding first soft bits 52 that were in turn obtained by demodulating the first data block 50.

Figure 5:
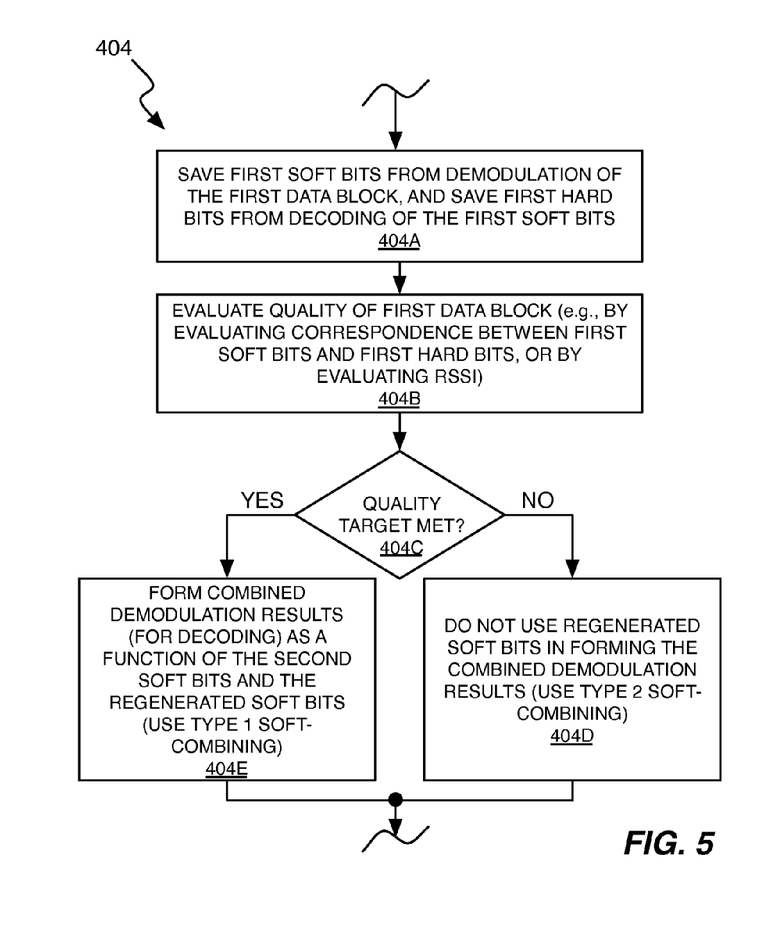
FIG. 5 is a logic flow diagram illustrating further example details for one aspect of the logic flow diagram of FIG. 4.

FIG. 5 elaborates example details for the processing implied by Block 404 in FIG. 4. Such processing includes saving the first soft bits 52 and saving the corresponding first hard bits 54 (Block 404A). The buffer(s) 32 shown in FIG. 1 are configured for such saving, for example. The retransmission processor 30 is configured to evaluate the correspondence between the first hard bits 54 and the first soft bits 52 (Block 404B).

The comparison can be performed in the "soft" domain, by converting the first hard bits 54 into regenerated soft bits 56 and comparing the regenerated soft bits 56 to respective ones of the first hard bits 52, or in the "hard" domain, by making hard bit decisions directly on the first soft bits 52 and comparing those hard decisions to respective ones of the first hard bits 54. If this evaluation indicates that the block quality satisfies a defined quality target (YES from Block 404C), then the retransmission processor 30 uses the regenerated soft bits 56 in forming the combined demodulation results 64 (Block 404E).

In the diagram, using the regenerated soft bits 56 in forming the combined demodulation results 64 is referred to as "Type 1" (or first mode) combining. If the evaluation of block quality indicates that the block quality does not satisfy the defined quality target (NO from Block 404C), the receiver 18 reverts to "Type 2" (or second mode) combining, where the regenerated soft bits 56 are not used in forming the combined demodulation results 64 (Block 404D). Thus, the receiver 18 can be understood as dynamically adapting its soft combining process, as used in its overall retransmission processing, in response to changes in signal quality. When signal quality is sufficient, the contemplated retransmission processing improves its soft combining process by using the regenerated soft bits 56 in the formation of the combined demodulation results 64, e.g., as a weighted combination of the regenerated soft bits 56 and the second soft bits 62—the first soft bits 52 also may be used in forming this improved soft combination. Conversely, when signal quality is not sufficient, the receiver 18 reverts back to its base (Type 2) soft combining process, wherein the regenerated soft bits 56 are not used in forming the combined demodulation results 64—e.g., the first and second soft bits 52 and 62 are combined, perhaps with other soft bits from one or more additional retransmissions.

In an example of dynamic selection between Type 1 and Type 2 soft combining processes, one may use a target Block Error Rate (BLER) to set the quality target for deciding whether signal quality is high enough to make use of the regenerated soft bits 56 in the soft combining process beneficial. For example, the BLER target is set at ten percent and the Received Signal Strength Indicator (RSSI) value that corresponds to the signal strength needed to maintain BLER at the BLER target can be denoted as RSSI_target. As an example, the block quality target value may be set as (RSSI_target−5.0) dBm. Further, it should be appreciated that the block quality target value may be configured as a tunable parameter.

The receiver 18 would then determine the data block quality for a given received data block by comparing the corresponding RSSI value to the block quality target value. If the RSSI value meets or exceeds threshold represented by the block quality target value, then the receiver 18 uses Type 1 soft combining, i.e., it uses the regenerated soft bits 56 in forming the combined demodulation results 64. Otherwise it uses Type 2 soft combining, i.e., it does not use the regenerated soft bits 56 in forming the combined demodulation results 64. Indeed, depending upon how the decision is made, the receiver 18 may skip the generation of the regenerated soft bits 56 altogether.

In any case, it will be understood that the receiver 18 offers significant potential for improved retransmission processing performance, at least during times of sufficient signal quality. Consequently, the receiver 18 is advantageously used across a variety of system or network types that use Chase combining and/or IR retransmission schemes. In an example embodiment, the receiver 18 comprises a GSM receiver that is configured to receive the first and second data blocks 50, 60 in a GSM/EDGE signal, as part of an incremental redundancy (IR), or chase combining, retransmission scheme.

Of course, in their conventional implementations, such retransmission schemes are well understood. For example, with IR-based approaches, the first data block 50 is the first redundancy version of a given data block. The receiver 18 demodulates it to obtain "burst-wise" soft bits, which are de-interleaved and de-punctured to obtain the first soft bits 52. These first soft bits 52 are passed along to the decoding circuit 28, which decodes them to obtain the first hard bits 54. If the CRC or other validation check indicates that the first data block 50 has been erroneously received, the receiver 18 requests a retransmission—e.g., NACK signalling transmitted via the transmitter 16—and saves the first soft bits 52 and the first hard bits 54.

Then, the receiver 18 receives a retransmission conveying the second data block 60 as a second redundancy version. The receiver 18 demodulates the second data block 60 along the lines detailed for the first data block 60, and thereby obtains demodulation results comprising the second soft bits 62. If the block check sequence number (BSN) of the first and second data blocks 50, 60 matches, then the receiver 18 knows to use the second soft bits 62 in forming the combined demodulation results 64, and it uses signal quality to decide whether that combination will include or omit the regenerated soft bits 56 corresponding to the first hard bits 54 decoded from the first data block 50.

Such usage boosts IR performance, as compared to simply combining the second soft bits 62 with the first soft bits 52. In deciding whether use of the regenerated soft bits 56 are likely to provide such boosting, the receiver 18 can estimate the block quality of the first data block 50 using a Block Quality Check algorithm, which is based on comparing the sign values of the first soft bits 52 with the sign values of corresponding ones of the regenerated soft bits 56. In going from the first hard bits 54 to the regenerated soft bits 56, it will be understood that the receiver 18 re-encodes the first hard bits 54 and converts them to signed soft values, e.g., hard bits having a binary value of 0 are converted to +1, and hard bits having a binary value of 1 are converted to −1. Weighting or confidence scaling also may be applied, e.g., to reflect a low confidence for punctured in the first transmission and a high confidence for non-punctured bits.

Of course, as noted earlier, the comparison also may be made in the hard domain, by making hard bit decisions on the first soft bits 52 and comparing the resulting binary values with corresponding ones of the first hard bits 54. Thus, a similar counting approach to block quality determination may be made, by comparing the number of binary values that are matched between individual ones of the hard decision values made on the first soft bits 52 and corresponding ones of the first hard bits 54.

In all cases, the formation of the combined demodulation results 64 can be understood as a functional combination of values, expressed as $$CDR = f(*),$$

where "CDR" denotes the combined demodulation results 64 and "*" denotes the functional arguments. In two examples for the case where the signal quality is sufficient to use the regenerated soft bits 56, the combined demodulation results 64 may be formed as $$CDR = f(RSB, SSB, FSB), \text{or}$$

$$CDR = f(RSB, SSB),$$

where "RSB" denotes the regenerated soft bits 56, "SSB" denotes the second soft bits 62, and "FSB" denotes the first soft bits 52. Example functions include weighted addition, such as $CDR = xRSB + ySSB + zFSB$.

Note that the second example equation can be understood as setting the "z" weighting variable to zero. Also note that the regenerated soft bits 56 can be formed simply by transforming the re-encoded first hard bits 54 into soft bits, or by performing such transformation and then averaging the resulting soft bits with the first soft bits 52. In this way, the first soft bits 52 contribute to the formation of the combined demodulation results 64 even though they would not appear as a explicit argument in the soft combining function $f$. In one such example, the relevant processing comprises converting the re-encoded first hard bits 54 into soft values, weighting those soft values by a weighting factor "w2," and combining them with the first soft bits 52, as weighted by a weighting factor "w1." The values of w1 and w2 are weightings tuned according to the equalizer type used in the receiver 18 for equalization and soft bit generation.

More generally, the combined demodulation results 64 can be formed according to a function $f$ operating on the regenerated soft bits 56 and the second soft bits 62, with or without explicit inclusion of the first soft bits 52, and the regenerated soft bits 56 may simply be "soft" versions of the first hard bits

54, or they may be formed by converting the first hard bits 54 to soft bits and combining those soft bits with the first soft bits 52 according to some function g(*), such as the w1, w2 weighting described above.

In either case, the combined demodulation results 64 are the decoding circuit 28 for (channel) decoding, in an attempt to recover the information bits conveyed in the first and second data blocks 50, 60. The CRC check or other decoding validation again fails, the process is repeated—e.g., the same process may be followed for the combining and decoding for each required re-transmission. Performance gains can increase with such repetitions, because more bits will be correctly decoded in successive repetitions and thus provide increased decoding gains, which improve soft bit regeneration.

Retransmission processing according to the improved soft combining process, wherein the regenerated soft bits 56 are used, can provide performance gains, e.g., 0.5 dB or more. These gains are particularly advantageous as the processing associated with generating and using the regenerated soft bits 56 is minimal. For example, the Packet Data Traffic Channel (PDTCH) as used in GPRS and EGPRS networks is interleaved over four bursts, and conventional processing includes the generation of retransmission feedback based decoding results. The incorporation of improved retransmission processing as taught herein does not impose extra delays or require extra decoding.

Further, all such processing is transparent to the remote transmitter. As such, a GSM/EDGE handset or other mobile device may be configured to carry out retransmission processing as described herein, with no impact on the GSM/EDGE network. Further, these performance improvements apply to any Modulation and Coding Scheme (MCS) used in EGPRS, and similar benefits may attain in Wideband Code Division Multiple Access (WCDMA) and Long Term Evolution (LTE) systems.

Also as noted earlier herein, the teachings herein may be applied to any number of retransmissions. Consider an example case where, after the first round of IR transmissions, all data has been retransmitted. The retransmission processing taught herein can then be applied to further improve performance. As an example, for MCS-7, there are three puncturing patterns. If four retransmissions are needed in this context, the first and fourth transmissions will contain identical information. Of course, the teachings herein apply to essentially any type of system where IR or Chase combining is used.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of retransmission processing in a communication receiver comprising:
   obtaining second soft bits by demodulating a second data block received as a retransmission of an earlier-received first data block that was unsuccessfully decoded by the receiver;
   evaluating whether the first data block satisfies a block quality target;
   if the first data block satisfies the block quality target, using a first type of soft combining to obtain combined demodulation results for decoding, said first type of soft combining including forming the combined demodulation results by combining the second soft bits with regenerated soft bits that were obtained by transforming first hard bits into said regenerated soft bits, wherein the first hard bits comprise decoding results obtained by decoding first soft bits that were obtained by demodulating the first data block;
   if the first data block does not satisfy the block quality target, using a second type of soft combining to obtain the combined demodulation results, said second type of soft combining including forming the combined demodulation results without use of the regenerated soft bits; and
   decoding the combined demodulation results in an attempt to correctly recover information bits encoded in the first and second data blocks.

2. The method of claim 1, wherein, for the second type of soft combining, forming the combined demodulation results without use of the regenerated soft bits comprises forming the combined demodulation results as a function of the first and second soft bits, but not as a function of the regenerated soft bits.

3. The method of claim 1, further comprising determining whether the first data block meets the block quality target by evaluating a correspondence between the first soft bits and the first hard bits.

4. The method of claim 3, wherein evaluating the correspondence between the first soft bits and the first hard bits comprises one of:
   comparing sign values of the first soft bits with corresponding sign values of the regenerated soft bits, wherein a greater number of matching sign values indicates a higher block quality for the first data block; or
   comparing bit values of the first hard bits to bit values of converted hard bits obtained by making hard decisions on the first soft bits, wherein a greater number of matching bit values indicates a higher block quality for the first data block.

5. The method of claim 1, wherein forming the combined demodulation results when using the first type of soft combining comprises forming them according to a function that weights the regenerated soft bits according to signal quality, wherein a lower signal quality results in less weighting of the regenerated soft bits in forming the combined demodulation results and a higher signal quality results in more weighting of the regenerated soft bits in forming the combined demodulation results.

6. The method of claim 1, wherein transforming the first hard bits into the regenerated soft bits comprises forming each regenerated soft bit as a sign determined by the binary value of the corresponding first hard bit and a magnitude that is set to a low-confidence value if the corresponding first hard bit corresponds to a punctured bit position in the first data block and that is set to a high-confidence value if the corresponding first hard bit corresponds to a non-punctured bit position in the first data block.

7. The method of claim 1, wherein transforming the first hard bits into the regenerated soft bits comprises forming a set of soft bits comprising, for each non-punctured bit position, the corresponding first soft bit, and, for each punctured bit position, the corresponding one of the soft values obtained by converting the first hard bits, after re-encoding, into said soft values.

8. The method of claim 1, further comprising, when using the first type of soft combining, forming the combined demodulation results by adding each second soft bit to the corresponding regenerated soft bit.

9. The method of claim 1, wherein the receiver comprises a GSM receiver, and further comprising receiving the first and second data blocks in a GSM/EDGE signal, as part of an incremental redundancy (IR), or chase combining, retransmission scheme.

10. The method of claim 1, further comprising determining whether the first data block satisfies a block quality target based on evaluating a Received Signal Strength Indicator (RSSI).

11. The method of claim 1, wherein transforming the first hard bits into the regenerated soft bits comprises weighting each first hard bit with a confidence weighting value that sets a confidence level of the resulting transformed soft bit, and combining the transformed soft bits with respective ones of the first soft bits to obtain the regenerated soft bits.

12. A communication receiver configured to perform retransmission processing and comprising one or more processing circuits configured to:
   obtain second soft bits by demodulating a second data block received as a retransmission of an earlier-received first data block that was unsuccessfully decoded by the receiver;
   evaluate whether the first data block satisfies a block quality target;
   if the first data block meets the block quality target, use a first type of soft combining to obtain combined demodulation results for decoding, said first type of soft combining including forming the combined demodulation results by combining the second soft bits with regenerated soft bits that were obtained by transforming first hard bits into said regenerated soft bits, wherein the first hard bits comprise decoding results obtained by decoding first soft bits that were obtained by demodulating the first data block;
   if the first data block does not satisfy the block quality target, use a second type of soft combining to obtain the combined demodulation results, said second type of soft combining including forming the combined demodulation results without use of the regenerated soft bits; and
   decode the combined demodulation results in an attempt to correctly recover information bits encoded in the first and second data blocks.

13. The receiver of claim 12, wherein the one or more processing circuits comprise:
   a demodulation circuit that is configured to demodulate the first and second data blocks, to obtain the first and second soft bits, respectively;
   a decoding circuit that is configured to decode the first soft bits to obtain the first hard bits, and to decode the combined demodulation results; and
   a retransmission processing circuit configured to evaluate whether the first data block meets the block quality target and to correspondingly control whether the regenerated soft bits are used in forming the combined demodulation results, based on selecting either the first or the second type of soft combining.

14. The receiver of claim 12, wherein, for the second type of soft combining, the one or more processing circuits are configured to form the combined demodulation results without use of the regenerated soft bits by forming the combined demodulation results as a function of the first and second soft bits, but not as a function of the regenerated soft bits.

15. The receiver of claim 12, wherein the one or more processing circuits are configured to determine whether the first data block meets the block quality target by evaluating a correspondence between the first soft bits and the first hard bits.

16. The receiver of claim 15, wherein the one or more processing circuits are configured to evaluate the correspondence between the first soft bits and the first hard bits based on being configured to:
   compare sign values of the first soft bits with corresponding sign values of the regenerated soft bits, wherein a greater number of matching sign values indicates a higher block quality for the first data block; or
   compare bit values of the first hard bits to bit values of converted hard bits obtained by making hard decisions on the first soft bits, wherein a greater number of matching bit values indicates a higher block quality for the first data block.

17. The receiver of claim 12, wherein the one or more processing circuits are configured to transform the first hard bits into the regenerated soft bits by forming a set of soft bits comprising, for each non-punctured bit position, the corresponding first soft bit, and, for each punctured bit position, the corresponding one of the soft values obtained by converting the first hard bits, after re-encoding, into said soft values.

18. The receiver of claim 12, wherein, when using the first type of soft combining, the one or more processing circuits are configured to form the combined demodulation results according to a function that weights the regenerated soft bits according to signal quality, wherein a lower signal quality results in less weighting of the regenerated soft bits in forming the combined demodulation results and a higher signal quality results in more weighting of the regenerated soft bits in forming the combined demodulation results.

19. The receiver of claim 12, wherein the one or more processing circuits are configured to transform the first hard bits into the regenerated soft bits based on forming each regenerated soft bit as a sign determined by the binary value of the corresponding first hard bit and a magnitude that is set to a low-confidence value if the corresponding first hard bit corresponds to a punctured bit position in the first data block and that is set to a high-confidence value if the corresponding first hard bit corresponds to a non-punctured bit position in the first data block.

20. The receiver of claim 12, wherein, when using the first type of soft combining, the one or more processing circuits are configured to form the combined demodulation results by adding each second soft bit to the corresponding regenerated soft bit.

21. The receiver of claim 12, wherein the receiver comprises a GSM receiver that is configured to receive the first and second data blocks in a GSM/EDGE signal, as part of an incremental redundancy (IR), or chase combining, retransmission scheme.

22. The receiver of claim 12, wherein the one or more processing circuits are configured to determine whether the first data block satisfies a block quality target based on evaluating a Received Signal Strength Indicator (RSSI).

23. The receiver of claim 12, wherein the one or more processing circuits are configured to transform the first hard bits into the regenerated soft bits by weighting each first hard bit with a confidence weighting value that sets confidence level of the resulting transformed soft bit, and combining the transformed soft bits with respective ones of the first soft bits to obtain respective ones of the regenerated soft bits.

24. A wireless communication apparatus comprising a communication receiver configured to perform retransmission processing and comprising one or more processing circuits configured to:
- obtain second soft bits by demodulating a second data block received as a retransmission of an earlier-received first data block that was unsuccessfully decoded by the receiver;
- evaluate whether the first data block satisfies a block quality target;
- if the first data block meets the block quality target, use a first type of soft combining to obtain combined demodulation results for decoding, said first type of soft combining including forming the combined demodulation results by combining the second soft bits with regenerated soft bits that were obtained by transforming first hard bits into said regenerated soft bits, wherein the first hard bits comprise decoding results obtained by decoding first soft bits that were obtained by demodulating the first data block;
- if the first data block does not satisfy the block quality target, use a second type of soft combining to obtain the combined demodulation results, said second type of soft combining including forming the combined demodulation results without use of the regenerated soft bits; and
- decode the combined demodulation results in an attempt to correctly recover information bits encoded in the first and second data blocks.

* * * * *